US009562485B1

(12) United States Patent
Nieman et al.

(10) Patent No.: US 9,562,485 B1
(45) Date of Patent: Feb. 7, 2017

(54) CYLINDER CUTOUT SYSTEM AND METHOD

(71) Applicant: Caterpillar Inc., Peoria, IL (US)

(72) Inventors: Derek E. Nieman, Peoria, IL (US); Ramamurthy Vaidyanathan, Peoria, IL (US); Derek Tanis, Peoria, IL (US); Jeffrey J. Ribordy, Chillicothe, IL (US); Frank J. Lombardi, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/835,947

(22) Filed: Aug. 26, 2015

(51) Int. Cl.
*B60T 7/12* (2006.01)
*F02D 41/00* (2006.01)

(52) U.S. Cl.
CPC ....... *F02D 41/0087* (2013.01); *F02D 41/0097* (2013.01)

(58) Field of Classification Search
CPC .............. F02B 19/1052; F02D 2700/02; F02D 2700/0225; F02D 35/0046; F02D 13/06; F02D 41/0087
USPC ...... 701/101, 103, 112; 123/434, 481, 198 F
See application file for complete search history.

(56) References Cited

U.S. PATENT DOCUMENTS

| | | | |
|---|---|---|---|
| 3,139,875 A | 7/1964 | Link | |
| 4,590,564 A | 5/1986 | Ishikawa et al. | |
| 6,662,785 B1 | 12/2003 | Sloane et al. | |
| 6,874,463 B1 | 4/2005 | Bolander et al. | |
| 7,478,620 B2 | 1/2009 | Kuo et al. | |
| 8,386,150 B2 | 2/2013 | Whitney et al. | |
| 2005/0166900 A1* | 8/2005 | Song | F01L 9/04 123/481 |
| 2006/0254564 A1* | 11/2006 | Lewis | F01L 9/04 123/491 |
| 2007/0051344 A1* | 3/2007 | Pallett | F02D 13/06 123/443 |
| 2015/0240738 A1* | 8/2015 | Yerace | F02B 3/08 123/27 GE |
| 2016/0010568 A1* | 1/2016 | Whiston | F01L 1/18 123/445 |
| 2016/0169147 A1* | 6/2016 | Surnilla | F02D 41/2467 123/299 |

* cited by examiner

*Primary Examiner* — John Kwon
(74) *Attorney, Agent, or Firm* — Leydig, Voit & Mayer, Ltd.

(57) ABSTRACT

The disclosure describes an internal combustion engine and a method for operating an internal combustion engine, in which an electronic controller is programmed to determine whether the internal combustion engine is operating within a cylinder cutout enabling region and, when the engine operates in the cylinder cutout enabling region, to cutout one or more of the engine cylinders by causing the cutout cylinder's fuel injector to cease injecting fuel into cutout cylinder, and to also cause the still-active engine cylinders to operate with an additional amount of fuel such that a steady state engine torque output remains unchanged before and after the second cylinder is cutout.

20 Claims, 7 Drawing Sheets

CYLINDER CUTOUT SYSTEM AND METHOD

TECHNICAL FIELD

This patent disclosure relates generally to internal combustion engines and, more particularly, to reciprocating piston engines.

BACKGROUND

Typical internal combustion engines include a reciprocating piston disposed within a cylinder having a closed end. A variable volume created between the piston, the cylinder, and the closed end encloses and compresses a fluid, which can include air, a mixture of air and exhaust gas, a combustible mixture, and other fluids. During operation, combustion of the fuel/air mixture creates hot and expanding exhaust gases, which push the piston along the cylinder. The piston is connected to a crankshaft, which includes an offset lobe connected to the piston via a connecting rod such that power generated during combustion pushes the piston, which in turn causes the crankshaft to rotate and produce useable power.

In turbocharged engines a performance tradeoff exists between turbo performance at rated power and boost available at no or low load conditions. For example, engine operation at rated power requires a large frame size turbine and compressor, which can effectively draw power from the engine's exhaust gas and use a portion of that power to compress air provided to the engine for combustion. At rated power, the engine will burn a large amount of fuel, which requires a large amount of air to maintain a desired air to fuel ratio. The relatively large turbocharger frame size can provide the appropriate air amount at a relatively low engine pumping loss, which increases engine efficiency. However, while engine operation at the rated power tends to require a large turbocharger frame size, as discussed above, low or no load engine performance, and also engine transient performance when the engine is accelerating, tends to require a smaller frame size. This is because the rotational inertia of the turbine and compressor wheel, and also the pressure that can be built up in the turbine and compressor, and also the rate at which pressure can be built up, will be improved from a smaller frame size turbocharger, which will also include smaller turbine and compressor wheels having a smaller rotational inertia permitting them to accelerate faster. The effect of a delay in engine power output increase because of the turbocharger is sometimes referred to as turbocharger or turbine lag or delay.

Thus, a tradeoff exists when sizing a turbocharger for an internal combustion engine. Typically, engines use a relatively larger frame size turbocharger to achieve desired operational characteristics at high engine loads, which compromises low end engine performance and can increase turbocharger lag. In an engine having a larger frame size turbocharger, at low or no engine load conditions such as idle, accelerating engine performance, snap torque increases and the like will be affected and limited by the amount of air that the turbocharger can provide if the engine is to maintain a desired air/fuel ratio.

Various solutions have been proposed in the past to address issues with turbocharger lag. For example, certain engines may use more than one turbocharger that operate in sequence or in parallel. In such engines, a large turbocharger may be used primarily for high load conditions while a second, smaller turbocharger may be used at low or no load conditions. These differently sized turbochargers, however, may still not address quick power increases of the engine output when the engine is operating at a mid-range condition. Other engines use two turbochargers in parallel, each of which is sized for a mid-engine range. These engines too, however, may not effectively and efficiently operate at rated power and no or low load conditions, and they may also increase engine pumping losses by the additional exhaust and fresh air conduits that are required to connect them to the engine.

An additional solution proposed in the past to in an attempt to decrease the effects of turbocharger lag in engine performance is to use a turbine having a variable frame. While a turbine of this type can simulate a smaller frame turbine, which can help in the low end of engine performance, the compressor is typically a fixed-frame compressor that is sized for the high end of engine performance, so the solution is only partly suited to address transient engine performance.

SUMMARY

In one aspect, the disclosure describes an internal combustion engine that includes a cylinder case forming at least a first cylinder and a second cylinder, each of the first cylinder and the second cylinder slidably containing a respective piston, a turbocharger having a turbine associated with a compressor, the turbine operating the compressor from exhaust gas provided by at least the a first cylinder during operation, a first fuel injector disposed to inject fuel into the first cylinder during operation, and a second fuel injector disposed to inject fuel into the second cylinder during operation, a plurality of sensors configured to provide signals indicative of engine operating parameters during operation, and an electronic controller configured to receive the signals from the plurality of sensors and to provide commands to the first injector and to the second injector, the commands causing the first injector or the second injector to inject the fuel into the respective first cylinder or second cylinder. The electronic controller is programmed to determine whether the internal combustion engine is operating within a cylinder cutout enabling region and, when the engine operates in the cylinder cutout enabling region, to cutout the second cylinder by causing the second fuel injector to cease injecting fuel into the second cylinder and the first fuel injector to inject an additional amount of fuel into the first cylinder, such that a steady state engine torque output remains unchanged before and after the second cylinder is cutout.

In another aspect, the disclosure describes a method for operating an internal combustion engine having a cylinder case forming at least a first cylinder and a second cylinder, each of the first cylinder and the second cylinder slidably containing a respective piston, a turbocharger having a turbine associated with a compressor, the turbine operating the compressor from exhaust gas provided by at least the a first cylinder during operation, a first fuel injector disposed to inject fuel into the first cylinder during operation, a second fuel injector disposed to inject fuel into the second cylinder during operation, a plurality of sensors configured to provide signals indicative of engine operating parameters during operation, and an electronic controller configured to receive the signals from the plurality of sensors and to provide commands to the first injector and to the second injector, the commands causing the first injector or the second injector to inject the fuel into the respective first cylinder or second cylinder. The method includes determining in the electronic controller when the internal combustion engine is operating within a cylinder cutout enabling region, and, when the engine operates in the cylinder cutout enabling region, using the electronic controller to cutout the second cylinder by causing the second fuel injector to cease injecting fuel into the second cylinder and the first fuel injector to inject an additional amount of fuel into the first cylinder, such that a steady state engine torque output remains unchanged before and after the second cylinder is cutout.

DETAILED DESCRIPTION

This disclosure relates to internal combustion engines having reciprocating pistons operating within cylinders formed in a cylinder block. In the embodiments illustrated herein, one or more cylinders of the engine are cutout when the engine is operating at low load, or an no load, which has the unexpected and surprising effect of increasing engine boost pressure, and which allows the engine to accelerate and increase its torque output faster than an engine that has all cylinders firing from the same starting point.

In one general aspect, the present disclosure describes a method of operating a direct injection engine, in which an injection signal is cutout, removed or temporarily suspended from one or more cylinders when the engine is operating at a no-load or a low-load condition such as idle. The cutting of the injection signal may be implemented on the same cylinders or to different cylinders as the engine operates. The non-fueling of a cylinder, which is generally described herein as the cutting-out or a cutout cylinder, causes the remaining cylinders, which are still firing, to increase fueling to maintain overall engine power output. However, because fewer than all cylinders are firing, the non-firing or cutout cylinders are still consuming power, for example, due to friction and to compress the air found therein, which decreases overall engine efficiency. This decreased efficiency is reflected in an overall higher fueling amount for the same engine power output, which higher fueling translates directly into increased energy supplied to the turbine, in the form of pressure and temperature (or, in other words, enthalpy) in the exhaust gas. The increased pressure and temperature of the exhaust gas causes a higher energy conversion at the turbine of the engine, which results in increased compressor work and, thus, higher engine boost, which as used here describes the pressure of air provided to an engine intake manifold, which may also include exhaust gas mixed with the air. With more boost, the fuel system can inject more fuel for the same air/fuel ratio, which in turn provides greater instantaneous power capability for the same starting load of the engine.

In one exemplary implementation, fueling thresholds can be established in an electronic controller that operates the fuel injectors of the engine such that a cylinder cutout strategy can be activated and deactivated, depending on engine operating conditions. In one example, when the desired engine fueling is below a threshold for given time period, the controller may cause the fueling to be cut from one or more engine cylinders. When the desired fueling is above a threshold for a given time period, the fueling may be restored to all engine cylinders by the controller. The controller may further determine how many cylinders to cut based on, for example, engine speed, engine load, engine fueling, altitude, temperature and/or additional or different engine operating parameters to maximize engine performance.

Figure 1:
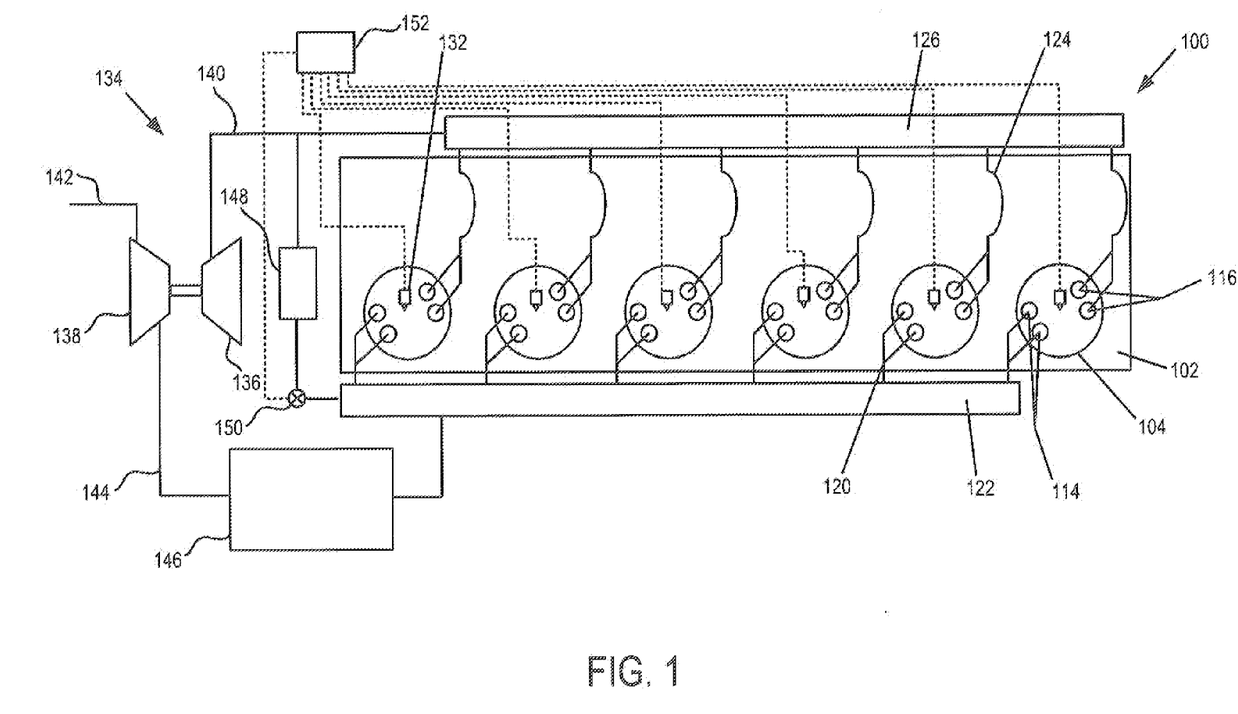
FIG. 1 is a block diagram of an engine in accordance with the disclosure.
Figure 2:
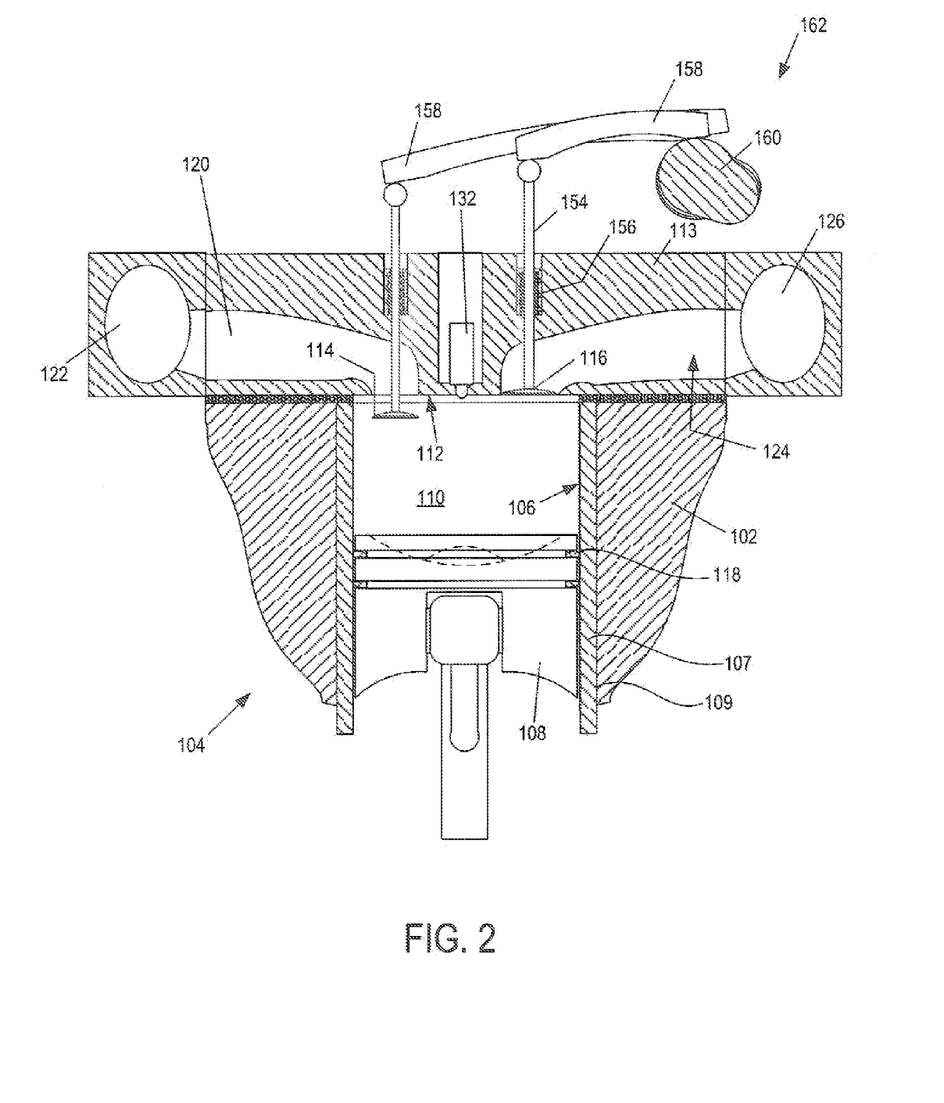
FIG. 2 is a fragmented view of an engine cylinder in accordance with the disclosure.

For the sake of illustration, an internal combustion engine 100 is shown in the block diagram of FIG. 1, and a fragmented view of an engine cylinder 104 is shown in FIG. 2. The engine 100 includes cylinder block 102 that forms a plurality of engine cylinders 104. In the illustrated embodiment, the engine 100 includes six cylinders 104 arranged in an inline configuration but any other number of cylinders, including a single cylinder, can be used, as well as any other cylinder configuration, such as a V-configuration. As shown in FIG. 2, each cylinder 104 includes a bore 106 slidably accepting therewithin a piston 108. As is known from typical engine applications, pistons can be connected to an engine crankshaft (not shown), which operates to provide a force tending to move each piston within the cylinder bore, for example, during a compression stroke, as well as can be moved by a force applied by the piston to rotate the crankshaft, for example, during a combustion or power stroke.

The cylinder 104 defines a variable volume 110 that, in the illustrated orientation, is laterally bound by the walls of the bore 106 and is closed at its ends by a top portion or crown of the piston 108 and by a flame deck 112 of the cylinder head 113, which is typically referred to as the lowermost surface of the cylinder head that is open to the cylinder. As shown, the bore 106 is formed within a hollow cylindrical sleeve 107 disposed within a bore 109 formed in the cylinder block 102, but other configurations may be used. The variable volume 110 changes between maximum and minimum capacity as the piston 108 reciprocates within the bore 106. In this respect, the piston 108 continuously reciprocates between a bottom dead center (BDC) position, in which the piston 108 is retracted by a maximum distance within the bore 106, and a top dead center (TDC) position, in which the piston 108 is inserted at a maximum extent within the bore 106.

In reference to FIG. 1, each cylinder 104 includes at least one intake valve 114 (two shown) and at least one exhaust valve 116 (two shown). The intake and exhaust valves 114 and 116 are selectively activated to fluidly connect the variable volume 110 with sinks and sources of fluids during operation of the engine 100. Specifically, the intake valve 114 selectively blocks an intake passage 120 that fluidly interconnects the variable volume 110 with an intake manifold 122. Similarly, the exhaust valve 116 selectively blocks an exhaust passage 124 that fluidly interconnects the variable volume 110 with an exhaust manifold 126. A fuel injector 132 is disposed to inject fuel within variable volume 110 (FIG. 2) at appropriate times during operation.

In the exemplary embodiment of the engine 100 shown in FIG. 1, the engine 100 includes a turbocharger 134 having a turbine 136 connected to a compressor 138, but other configurations, such as multi-staged, series or parallel turbocharger configurations may be used. During operation of the engine 100, exhaust gas collected in the exhaust manifold 126 is provided to drive the turbine 136 through an exhaust conduit 140. Exhaust conduit and after-treatment components disposed downstream of the turbine 136 are not shown in FIG. 1 for simplicity, but any appropriate configuration may be used.

The turbine 136 drives the compressor 138, which compresses filtered, ambient air from an intake duct 142 to provide compressed, charge air to an air conduit 144. The air conduit 144 includes an optional charge air cooler (CAC) cooler 146, which cools the charge air before it is provided to the intake manifold 122. The illustrated engine 100 further includes a high pressure loop (HPL) exhaust gas recirculation (EGR) system, but other types of EGR systems such as low or intermediate pressure systems may be used. Depending the requirements of the specific engine application, the EGR system may be omitted entirely. In the illustrated embodiment, the EGR system includes an EGR cooler 148 that fluidly interconnects the exhaust manifold 126 with the intake manifold 122 such that cooled exhaust gas can be provided to the intake of the engine. An EGR valve 150 is disposed to meter the amount of exhaust gas recirculated in this fashion.

The engine 100 further includes an electronic controller 152. The electronic controller 152 may be a single controller or may include more than one controller disposed to control various functions and/or features of the engine 100 and/or features of a vehicle or machine in which the engine 100 is installed. For example, a master controller, used to control the overall operation and function of a machine, may be cooperatively implemented with a motor or engine controller used to control the engine 100. In this embodiment, the term "controller" is meant to include one, two, or more controllers that may be associated with the engine 100 and that may cooperate in controlling various functions and operations of the engine 100 (FIG. 1), or any other embodiments for engines described hereinafter. The functionality of the controller, while described conceptually in the present disclosure to include various discrete functions for illustrative purposes only, may be implemented in hardware and/or software without regard to the discrete functionality shown. Accordingly, various interfaces of the controller are described relative to components of the engine 100 shown in FIG. 1, but such interfaces are not intended to limit the type and number of components that are connected, nor the number of controllers that are described.

Accordingly, the controller 152 is associated with each of the fuel injectors 132 and the EGR valve 150 and configured to selectively control their operation. The controller 152 is further associated with sensors and actuators of the engine such as crankshaft and/or camshaft position sensors (not shown), engine speed and/or torque sensors (not shown), and other known sensors and actuators that participate in providing functions and information to the controller 152 to control and monitor engine operation. Relative to the present disclosure, the controller 152 is programmed and configured to provide appropriate injection commands to the fuel injectors 132 and to determine, during operation, the number and timing of cylinder cutouts.

In the embodiment illustrated in FIG. 2, valve activation is accomplished by a traditional cam-follower arrangement or any other suitable fixed or variable valve activation arrangement. As shown, each of the intake and exhaust valves 114, 116 has a respective valve stem 154 that pushes the valve to open against a respective closing spring 156. Each valve stem 154 is pushed by a valve bridge 158 that follows a respective lobe 160 of a rotating camshaft 162 in the known fashion. The rate of rotation of the camshaft may depend on the particular mode of engine operation such as 4-stroke operation, 6-stroke operation, and others.

Most engine operating cycles will include an intake stroke, in which air or a mixture of air with exhaust gas will be admitted into the variable volume 110, and a compression stroke, in which the piston moves from the BDC position towards the TDC position. At an intermediate position of the piston during the compression stroke, during an expansion stroke, and/or during a fuel injection carried out while the cylinder is undergoing an expansion stroke, the injector may inject fuel within the variable volume to create a combustible mixture that ignites and/or burns to create expanding gases that push the piston during the power stroke. For those cylinders that may be cutout, the step of fuel injection may be omitted. In a hybrid implementation, to reduce the power consumption of cutout cylinders, a small amount of fuel may be added to the cutout cylinders to make up for the power consumed to compress the air mixture during the compression stroke.

Figure 3:
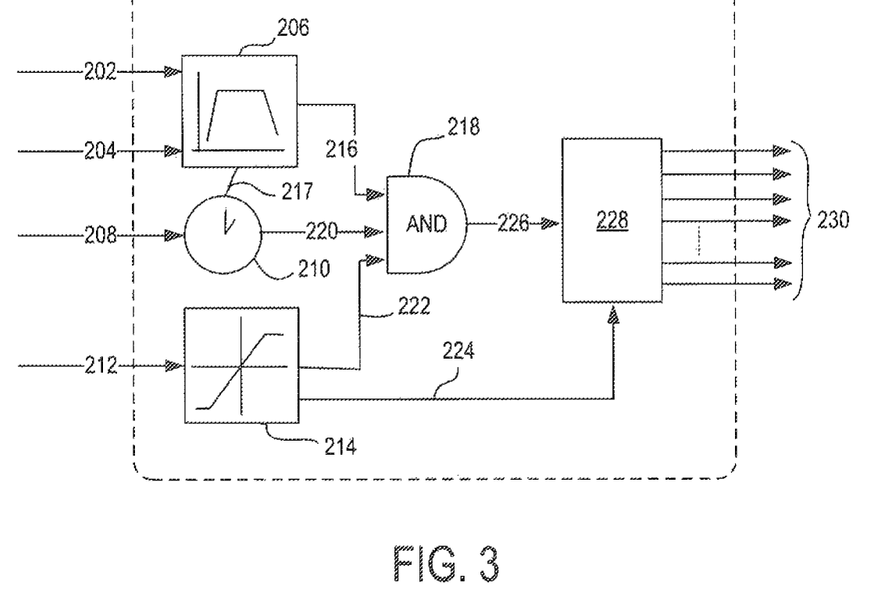
FIG. 3 is a block diagram for a cylinder cutout controller in accordance with the disclosure.

The methodology for implementing a cylinder cutout strategy, and its effects in improving transient engine performance will now be described in further detail. FIG. 3 is a block diagram of an engine controller 200 in accordance with the disclosure. The controller 200 may be an algorithm implemented and operating within the controller 152 (shown in FIG. 1) that is suited for activating or deactivating cylinders by sending or, respectively, not sending, fueling commands to the various fuel injectors 132 (also shown in FIG. 1) of the engine. The controller 200 receives various signals indicative of an engine operating condition and various engine operating parameters. In the illustrated embodiment, the controller 200 receives an engine speed signal 202 and an engine load signal 204, which may be indicative of an actual engine power or torque output. The engine speed and load signals 202 and 204 are provided to an engine map 206, which includes information about the engine operating range in terms of speed and load. The controller further receives a time signal 208 that is provided to a timer function 210. A desired engine load 212 is provided to a determinator function 214. Additional and/or different signals may alternatively be provided to the controller 200 than those shown, which are presented in a simplified fashion for purpose of discussion.

The engine map 206 interpolates an engine operating point or condition based on the engine speed signal 202 and the engine load signal 204 to determine whether the engine is operating within a desired range for cylinder cutoff. For example, the desired range for cylinder cutoff may include a range of low engine speeds, i.e., within an engine idle speed range, and relatively low or no engine loads, for example, loads that are applied to an idling engine to power auxiliary systems and the like. When the engine is operating in the desired range for cylinder cutoff, the engine map 206 may provide an enabling flag 216 to an AND comparator 218. The engine map 206 may further provide an indication 217 of a change in engine operating conditions each time the engine speed and/or the engine load signals 202 and 204 change by more than a threshold or predefined amount.

The timer function 210 may monitor the time signal 208, and also the indication 217, and signal a steady engine operation period 220 when engine operating conditions have not changed more than a predefined amount for a predefined period. For example, the timer function 210 may signal the steady engine operation period 220 when the engine has been idling for at least 5 minutes. The steady engine operation period 220 is also provided to the AND comparator 218.

The desired engine load 212, which may also be correlated to a desired engine fueling rate, is provided to the determinator function 214, which operates to determine whether the present fueling rate of the engine and whether an increase in engine load has been requested, for example, by the user or another function of a machine controller, and provides an engine load indication 222 to the AND comparator 218. The determinator function 214 further provides a change magnitude indication 224 that may indicate the magnitude of the change in engine load that has been requested by the operator and/or the system in general.

When the engine is operating within a region of the engine map that is not suited for quick load increases in engine output, for example, such as idle, the engine map 206 may activate the enabling flag 216, which indicates that a cylinder cutout strategy can be activated to improve the transient response of the engine. The cutout may then be implemented when the requested engine load, a sudden load application is made to the engine, or the engine is required to increase its speed and/or load quickly in a transient change. The various engine regions may be predefined for static conditions, such as an expected low boost condition at around idle, and even for dynamic conditions, such as low boost that may limit the engine's ability to increase fuelling, and thus, power, quickly during operation. When the enabling flag 216 is present for a predefined period, as indicated by activation of the steady engine operation period 220, and a load increase has been requested, as indicated by the indication 222, all signals provided to the AND comparator 218 will be active, causing a cylinder cutout request 226 to activate at the output of the AND comparator 218.

Activation of the cylinder cutout request 226 is provided to a cylinder cutout controller 228, which determines which engine cylinders remain active, i.e., receive fuel commands to product power, and which cylinders will be cutout, i.e., will receive a minimal or no fuel injection command, during engine operation. The cylinder cutout controller 228 includes a plurality of cylinder command lines 230, one for each engine cylinder, which convey the controller's commands to the injection module of the engine (not shown here) and dictate which cylinders will continue receiving fueling commands, and which cylinders will be cutout. Depending on the magnitude of the power increase commanded by the user, as provided by the engine magnitude indication 224, the controller 228 may command the cutout of one, two, three or more cylinders of the engine, with an increasing number of cylinders being cut to correspond to larger increases in requested engine power.

Figure 4:
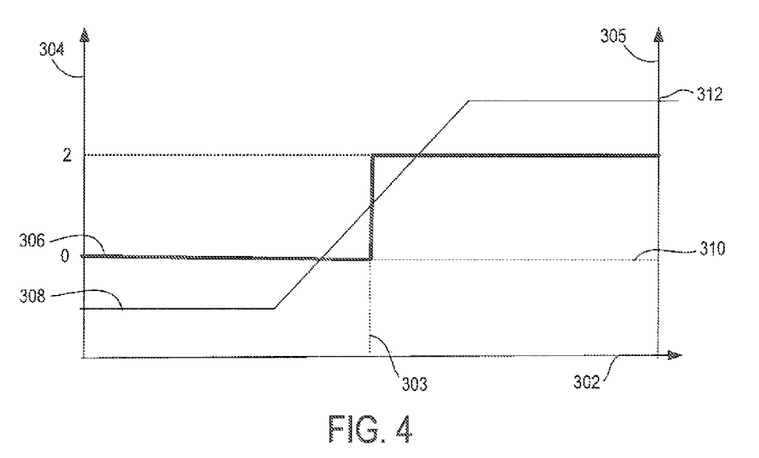
FIG. 4 is a qualitative chart of a change in fueling when one or more cylinders are cutout, in accordance with the disclosure.

The more cylinders of the engine that are cutout, the larger the amount of fuel injected into the operating or firing cylinders is to ensure that engine power is maintained. A qualitative graph showing an incremental fueling increase in firing cylinders in an engine when cylinders are cutout is shown in FIG. 4. As shown in the graph, where the horizontal axis 302 represents time, the left vertical axis 304 represents the number of cylinders that are cutout, and the right vertical axis 305 represents fueling per still-firing engine cylinder, at a trigger time 303 when two cylinders are cutout, as indicated by line 306, the fueling 308 increases from a low value 310 to a high value 312. The magnitude of the fueling rate increase for the firing cylinders will depend on the number of engine cylinders in the engine and also on the number of cylinders that will be cutout. For purpose of illustration, in an engine having two cylinders, when one of the two cylinders is cutout, the remaining, still-firing cylinder, will continue operating at a fueling rate that is at least double as compared to the fueling rate for that cylinder when both cylinders were firing and the engine operates at the same operating condition in terms of engine speed and load.

Figure 5:
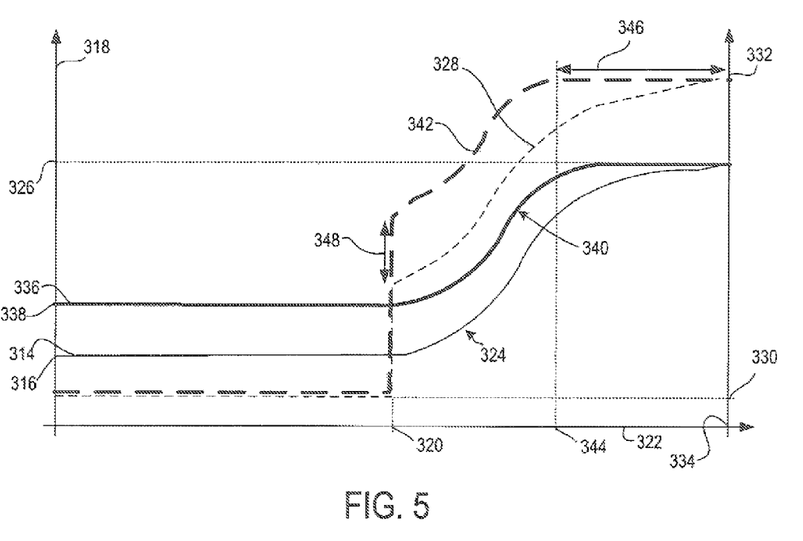
FIG. 5 is a qualitative chart comparing boost and torque output for a baseline engine condition and a cylinder cutout condition in accordance with the disclosure.

Engine performance at no or low load conditions, such as idle, during a cylinder cutout surprisingly and unexpectedly improves the transient ability of the engine to increase the rate load output increases. A qualitative graph showing a comparison between a baseline engine transient ability, and the transient ability for the same engine but with cylinder cutout being implemented, is shown in FIG. 5. In this figure, a baseline curve 314 representing engine boost (defined as fluid pressure within the engine's intake manifold, or an equivalent parameter) is at a certain level 316 as indicated on a vertical axis 318.

At a trigger time 320, which is denoted along the horizontal axis 322, a snap load increase is requested by the engine. In response, an engine controller may begin increasing cylinder fueling while maintaining a constant or at least a predefined air to fuel ratio. The turbocharger lag discussed previously may limit the engine's ability to increase its fueling, and thus the enthalpy of the exhaust gas driving the turbine, which shapes an increasing segment 324 of the baseline curve 314 representing engine boost up to a target boost value 326. The rate of boost increase of the engine also determines the rate at which fuel can be added to the cylinders, and thus engine power output, which is represented by the dashed-line curve 328. Accordingly, the engine torque increases from an initial value 330 to a final value 332 along the curve 328, as shown in the graph. The time for engine boost to reach the target boost value 326 and the torque to reach the final value 332 is denoted as a baseline time 334.

Also shown in FIG. 5, for purpose of comparison, are curves representing engine boost and engine torque for the same engine that is operating with certain engine cylinders having been cutout. Specifically, a cutout curve 336 representing engine boost is at a certain, increased level 338 as indicated on the vertical axis 318. When certain cylinders are cutout, the staring boost of the engine is increased due to the increased power provided to the turbocharger as compared to an engine operating at the same speed and load with all cylinders firing. At the trigger time 320, the same snap load increase is applied to the engine as the baseline case described above, where all engine cylinders are firing.

In the case of the engine operating with cutout cylinders, the engine controller may increase cylinder fueling to the firing cylinders while maintaining a constant or at least a predefined air to fuel ratio, which in this case, given the increased boost, causes the engine to develop power faster. The turbocharger lag discussed previously still limits the engine's ability to increase its fueling, and thus the enthalpy of the exhaust gas driving the turbine, but has a lesser effect. As a result, the cutout curve 336 forms an increasing segment 340 up to the target boost value 326 that is sharper than the corresponding increasing segment 324 of the baseline curve 314. The sharper rate of boost increase of the engine having cutout cylinders is also reflected in the sharper increase in engine torque 342 from the initial value 330 to the final value 332, as shown in the graph.

Advantageously, the time for engine boost when cylinders are cutout, as indicated by the cutout curve 336, to reach the target boost value 326, is considerably shorter than the baseline time. As an illustration, the cutout curve 336 reaches the target boost value 326 at a time 344, which as is shown in FIG. 5 is more than 50% faster than the time it takes the baseline curve 314 to reach the same value. Similarly, the engine torque 342 reaches the final value 332 faster than its baseline counterpart represented by the dashed-line curve 328. In short, a time 346 representing the shortening of the time required for the engine to reach desired or target boost and torque represents a 55% reduction in the time required for the engine to reach these parameters when certain cylinders have been cutout. As shown, the engine has six cylinders from which three have been cutout. Part of the reason for the shorter time is an offset 348 in the boost and torque output of the engine, which is a surprising, unexpected and direct result of cylinder cutout low or no load engine performance.

Figure 6:
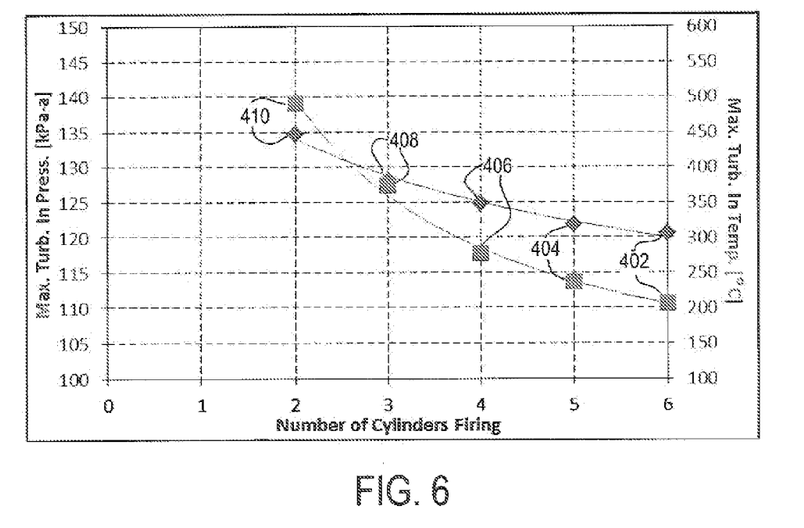
FIGS. 6 and 7 are pressure charts or turbine inlet pressure and compressor outlet pressure for various engine operating conditions in accordance with the disclosure.
Figure 7:
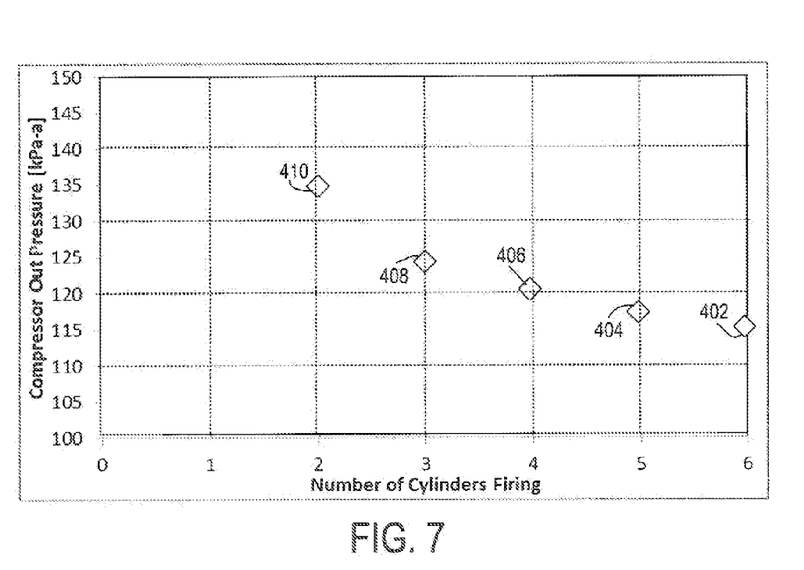

Exemplary data of various engine operating parameters will now be presented. FIGS. 6 and 7 are graphs showing the effect on turbine inlet pressure, turbine inlet temperature, and compressor outlet pressure for an engine, for example, the engine 100 shown in FIG. 1 and having six cylinders, when one, two, three or four cylinders have been cutout, which respectively leaves five, four, three or two cylinders still firing. A data point is plotted for each operating condition of the engine having the corresponding number of cylinders firing. Accordingly, in reference to the graphs of FIGS. 6 and 8, a first point 402 represents a collection of baseline points at which all six engine cylinders are firing. At the first points 402, as denoted in both FIGS. 6 and 7, a turbine inlet temperature, which is represented by squares in FIG. 6, is at about 200 deg. C., and the turbine inlet pressure, which is represented by diamonds in FIG. 6, is at about 120 kPa-a. The compressor outlet pressure, which is essentially an indication of engine boost pressure and which is represented by diamonds in FIG. 7, is at about 115 kPa-a.

The graphs in FIGS. 6 and 7 show the effect on these parameters when one, two, three and four cylinders are cutout. In this way, a second set of points 404 represent a single cylinder cutout (with five cylinders firing), a third set of points 406 represent two cylinders cutout (with four cylinders firing), a fourth set of points 408 represent three cylinders cutout (with three cylinders firing), and a fifth set of points 410 represent four cylinders cutout (with two cylinders firing). As can be seen from FIGS. 6 and 7, the trends for turbine inlet temperature, turbine inlet pressure and the resulting boost produced by the turbocharger are increasing for an increasing number of cutout cylinders. For example, turbine inlet temperature increases by almost 150% from the baseline when four cylinders are cutout. Similarly, turbine inlet pressure increases by 12.5% as compared to the baseline when four of the six cylinders are cutout. Such increases in pressure and temperature at the inlet of the turbine, allow the turbine to extract more energy from the exhaust gas, which means more energy is provided to the compressor, thus increasing its work output. Accordingly, the compressor outlet pressure increases by almost 20% as compared to the baseline when four of the six cylinders are cutout.

Figure 8:
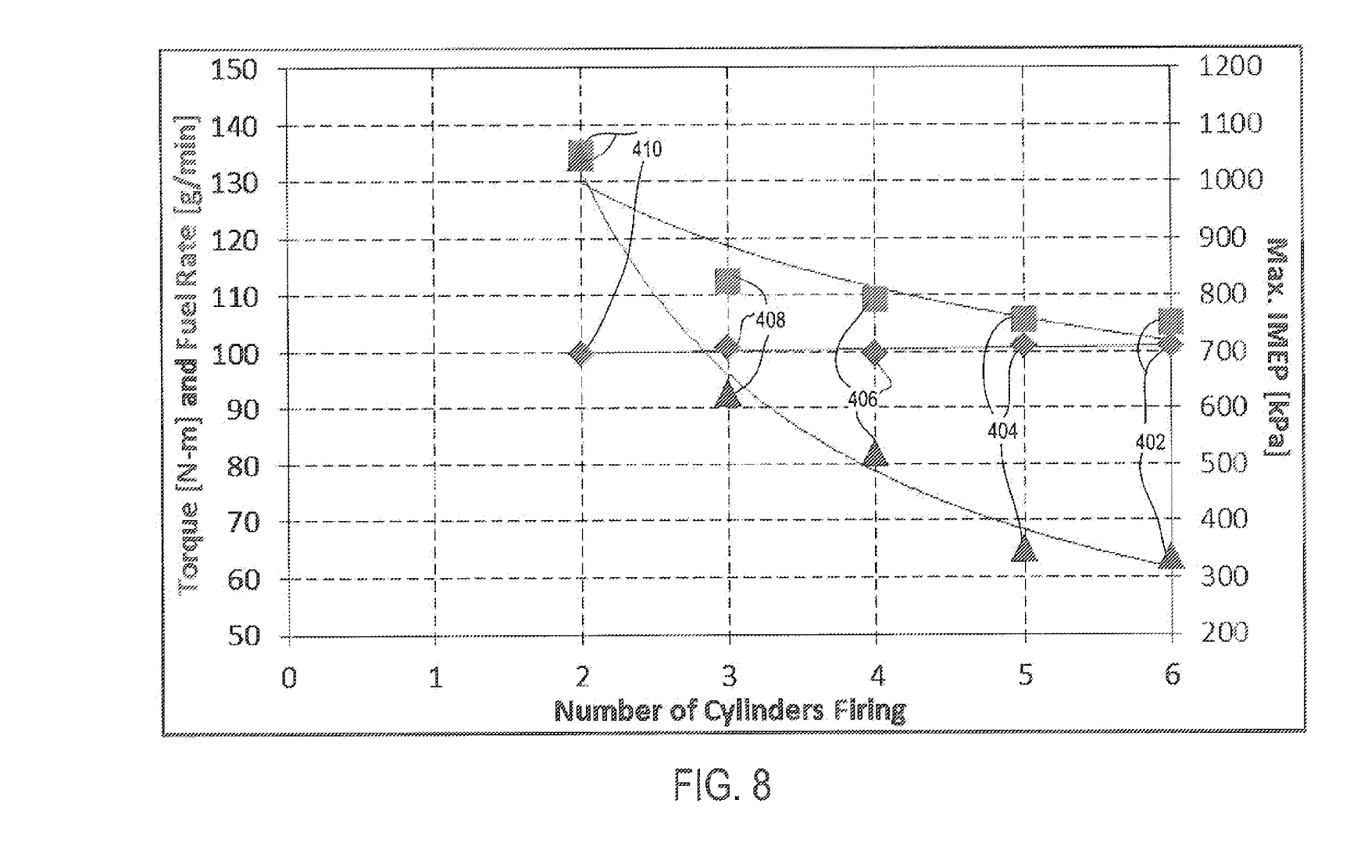
FIG. 8 is a chart of various engine operating parameters in accordance with the disclosure.

Additional data points for the first through fifth sets of points 402-410, as discussed above relative to FIGS. 6 and 7, are shown in FIG. 8, where diamonds represent engine torque output, squares represent fuel rate (per still-firing engine cylinder), and triangles represent max. intake mean effective pressure (IMEP), which is a parameter directly related to engine boost pressure. As can be seen from the chart, for an engine torque that remains relatively unchanged as more engine cylinders are cutout, the fuel rate for the still-firing cylinders increases by about 30% as compared to the baseline when four cylinders have been cutout. For that same condition, the IMEP increases by more than 300% as the fuel increases. This may mean that the still-firing cylinders work harder to make up the loss of power generation from the cutout or non-firing cylinders, which increases the temperature and pressure of the exhaust gas provided to the turbocharger.

INDUSTRIAL APPLICABILITY

The present disclosure is applicable to internal combustion engines and, specifically, engines having two or more reciprocating pistons. In the disclosed embodiments, an engine having a fuel injector configured to inject fuel directly into a respective engine cylinder is described, but such embodiment is exemplary and should not be understood as limiting to the scope of the invention. In general, the present disclosure is applicable to any engine type, including spark ignition or compression ignition engines. Further, the present disclosure applies to engines operating with any one or more fuel types such as gasoline, diesel, natural or liquid petroleum gas, and other fuels and/or mixtures of fuels. The fuel delivery into the engine cylinders may be accomplished by direct injection, or may be provided upstream of the cylinders, for example, in an intake manifold of the engine, an intake runner of the cylinder, and other delivery modes. Lastly, although a four stroke engine operating cycle is commonly used, more or fewer than four strokes may be used.

Figure 9:
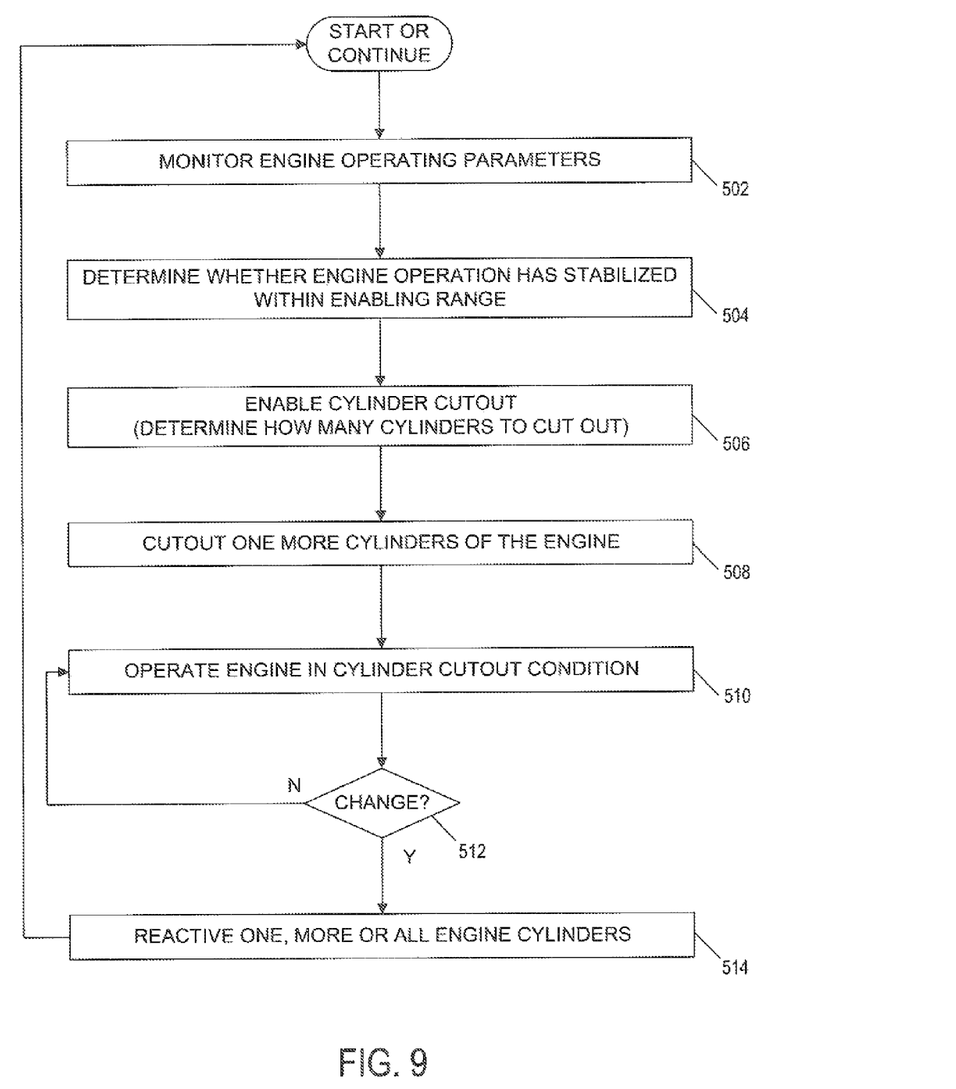
FIG. 9 is a flowchart for a method of operating an engine in accordance with the disclosure.

A flowchart for a method of operating an engine in accordance with the disclosure is shown in FIG. 9. In accordance with the method, an engine controller monitors engine operating parameters at 502 to determine, at 504, whether engine operation has stabilized around a no-load or low-load engine operating condition for a predefined period. The stabilized engine operation in an enabling range for cylinder cutout may include comparing engine speed and load, and also a timer value, with threshold or enabling ranges. When the engine has been operating at an enabling condition for at least a desired time, the controller enables cylinder cutout at 506, which may include the optional operation of dynamically determining how many cylinders to cutout based on the then present engine speed and load. One or more cylinders are cutout at 508, and the engine operates at the cylinder cutout condition 510. Optionally, the controller may cutout different cylinders at different times, with the total number of cutout cylinders at any time being equal to a desired number of cutout cylinders for the then-present engine operating condition. It is noted that, in one embodiment, the engine may operate with all cylinders firing, even if the engine operating point, for example, the then-present engine speed and load, are within a cylinder cutout enabling range of engine speeds and loads. A cutout of one or more engine cylinders may be prompted by an increase in a command for engine power such as an acceleration or an increase in engine load. For example, an engine operating at low load, which experiences a load increase, may implement a cutout of certain engine cylinders when additional boost pressure is required to quickly deliver the engine power requested. Other conditions may include engine load acceptance, increasing engine speed and power transient operation, and the like.

The cylinders remain cutout while no change in engine operation has been detected in the controller at 512. When an engine operating condition changes, e.g., when engine speed and load have increased beyond a cutout enabling range or engine operating points, the controller may reactivate all engine cylinders at 514, and the process repeats while the engine operates.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An internal combustion engine, comprising:
   a cylinder case forming at least a first cylinder and a second cylinder, each of the first cylinder and the second cylinder slidably containing a respective piston;
   a turbocharger having a turbine associated with a compressor, the turbine operating the compressor from exhaust gas provided by at least the first cylinder during operation;
   a first fuel injector disposed to inject fuel into the first cylinder during operation, and a second fuel injector disposed to inject fuel into the second cylinder during operation;
   a plurality of sensors configured to provide signals indicative of engine operating parameters during operation; and
   an electronic controller configured to receive the signals from the plurality of sensors and to provide commands to the first fuel injector and to the second fuel injector, the commands causing the first fuel injector or the second fuel injector to inject the fuel into, respectively, the first cylinder or the second cylinder;
   wherein the electronic controller is programmed to determine whether the internal combustion engine is operating within a cylinder cutout enabling region and, when the engine operates in the cylinder cutout enabling region, to cutout the second cylinder by causing the second fuel injector to cease injecting fuel into the second cylinder and the first fuel injector to inject an additional amount of fuel into the first cylinder, such that a steady state engine torque output remains unchanged before and after the second cylinder is cutout.

2. The internal combustion engine of claim 1, wherein the cylinder cutout enabling region includes idle engine operation.

3. The internal combustion engine of claim 1, wherein the cylinder cutout enabling region includes no load to low load engine output, and low engine speed.

4. The internal combustion engine of claim 1, wherein the cylinder case forms additional cylinders, and wherein the electronic controller is programmed to cutout at least one of the additional cylinders.

5. The internal combustion engine of claim 4, wherein the electronic controller is further programmed to cause the first fuel injector to incrementally increase an amount of fuel injected into the first cylinder for every additional cylinder that is cutout.

6. The internal combustion engine of claim 1, wherein the signals indicative of engine operating parameters include signals indicative of engine speed and engine load.

7. The internal combustion engine of claim 6, wherein the signals further include a desired engine load output.

8. The internal combustion engine of claim 7, wherein the signals further include a time since a change in engine operation occurred.

9. The internal combustion engine of claim 1, wherein the additional amount of fuel injected into the first cylinder when the second cylinder has been cutout is arranged and configured to increase a temperature and a pressure of exhaust gas provided to the turbine after the second cylinder cutout as compared to a corresponding temperature and pressure of exhaust gas provided to the turbine before the second cylinder cutout with the engine operating at a constant engine speed and a constant engine load output.

10. The internal combustion engine of claim 1, wherein the internal combustion engine includes more than two cylinders, and wherein the electronic controller is further programmed to determine the number of engine cylinders to cutout based on the signals.

11. The internal combustion engine of claim 10, wherein the electronic controller is programmed to change which cylinder is cutout during operation.

12. The internal combustion engine of claim 1, wherein the cylinder case further forms a third cylinder, a fourth cylinder, a fifth cylinder and a sixth cylinder, for a total of six cylinders, and further includes a third fuel injector configured to inject fuel into the third cylinder, a fourth fuel injector configured to inject fuel into the fourth cylinder, a fifth fuel injector configured to inject fuel into the fifth cylinder, and a sixth fuel injector configured to inject fuel into the sixth cylinder, and wherein the electronic controller is further programmed to selectively cutout one, two, three or four of the six cylinders.

13. A method for operating an internal combustion engine having a cylinder case forming at least a first cylinder and a second cylinder, each of the first cylinder and the second cylinder slidably containing a respective piston, a turbocharger having a turbine associated with a compressor, the turbine operating the compressor from exhaust gas provided by at least the first cylinder during operation, a first fuel injector disposed to inject fuel into the first cylinder during operation, a second fuel injector disposed to inject fuel into the second cylinder during operation, a plurality of sensors configured to provide signals indicative of engine operating parameters during operation, and an electronic controller configured to receive the signals from the plurality of sensors and to provide commands to the first fuel injector and to the second fuel injector, the commands causing the first fuel injector or the second fuel injector to inject the fuel into, respectively, the first cylinder or the second cylinder, the method comprising:
   determining in the electronic controller when the internal combustion engine is operating within a cylinder cutout enabling region; and when the engine operates in the cylinder cutout enabling region, using the electronic controller to cutout the second cylinder by causing the second fuel injector to cease injecting fuel into the second cylinder and the first fuel injector to inject an additional amount of fuel into the first cylinder, such that a steady state engine torque output remains unchanged before and after the second cylinder is cutout.

14. The method of claim 13, wherein the cylinder cutout enabling region includes idle engine operation.

15. The method of claim 13, wherein the cylinder cutout enabling region includes no load to low load engine output, and low engine speed.

16. The method of claim 13, wherein the cylinder case forms additional cylinders, and wherein the method further comprises cutting out at least one of the additional cylinders in the electronic controller.

17. The method of claim 16, wherein the method further comprises causing the first fuel injector to incrementally increase an amount of fuel injected into the first cylinder for every additional cylinder that is cutout.

18. The method of claim 13, wherein the signals indicative of engine operating parameters include signals indicative of engine speed and engine load.

19. The method of claim 18, wherein the signals further include a desired engine load output.

20. The method of claim 19, wherein the signals further include a time since a change in engine operation occurred.

\* \* \* \* \*